United States Patent
Mould et al.

(10) Patent No.: US 9,315,189 B2
(45) Date of Patent: Apr. 19, 2016

(54) HYBRID ELECTRIC VEHICLE AND METHOD OF CONTROL THEREOF

(71) Applicant: Jaguar Land Rover Limited, Coventry (GB)

(72) Inventors: Andy Mould, Coventry (GB); Neil Dixon, Coventry (GB); Yiannis Eftychiou, Coventry (GB); Clement Dextreit, Coventry (GB); Andi Lowndes, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/374,364

(22) PCT Filed: Jan. 24, 2013

(86) PCT No.: PCT/EP2013/051342
§ 371 (c)(1),
(2) Date: Jul. 24, 2014

(87) PCT Pub. No.: WO2013/110706
PCT Pub. Date: Aug. 1, 2013

(65) Prior Publication Data
US 2015/0291152 A1   Oct. 15, 2015

(30) Foreign Application Priority Data

Jan. 25, 2012 (GB) .................................. 1201221.7

(51) Int. Cl.
*B60L 9/00* (2006.01)
*B62D 6/00* (2006.01)
(Continued)

(52) U.S. Cl.
CPC ........... *B60W 20/1088* (2013.01); *B60W 10/06* (2013.01); *B60W 10/08* (2013.01);
(Continued)

(58) Field of Classification Search
CPC ............ B60W 20/1088; B60W 40/09; B60W 30/182; B60W 10/06; B60W 10/08; B60W 50/14; B60W 20/106; B60W 2540/10; B60W 2050/146; B60W 2710/0677; B60W 2710/086; B60W 2050/143; B60W 2400/00; Y10S 903/93
USPC ..................................................... 701/22, 41
See application file for complete search history.

(56) References Cited

U.S. PATENT DOCUMENTS 8,788,113 B2 * 7/2014 Filev ................... B60W 50/085
340/438
2006/0048516 A1    3/2006 Tenbrock et al.
(Continued)

FOREIGN PATENT DOCUMENTS

DE  10 2004 043 587 A1   3/2006
FR        2928122 A1        9/2009
(Continued)

OTHER PUBLICATIONS

Office Action Summary, Japanese Patent Application No. 2014-553716, Aug. 18, 2015.

*Primary Examiner* — Thomas G Black
*Assistant Examiner* — Tyler Paige
(74) *Attorney, Agent, or Firm* — Myers Bigel & Sibley

(57) ABSTRACT

A hybrid electric vehicle (100) comprising: a fuel powered engine (121) and electric motor means (123) operable to provide torque to drive the vehicle (100); energy storage means (150) operable to store electrical energy generated by generator means (123) for driving the electric motor means (123); and energy management means (140) for controlling the engine (121) and electric motor means (123) to provide torque to drive the vehicle and for controlling the generator means to generate electrical energy for storage in the energy storage means, wherein the vehicle comprises control means operable to monitor a value of one or more parameters associated with the vehicle, the control means being arranged automatically to identify a current driving style of a driver ranging from an economy-oriented driving style to a performance-oriented driving style responsive to the value of the one or more parameters, the energy management means being operable to control the engine, electric motor means and generator means responsive to the driving style of the user.

17 Claims, 7 Drawing Sheets

(51) Int. Cl.

| | |
|---|---|
| *B60W 20/00* | (2006.01) |
| *B60W 10/06* | (2006.01) |
| *B60W 10/08* | (2006.01) |
| *B60W 10/26* | (2006.01) |
| *B60W 30/182* | (2012.01) |
| *B60W 40/09* | (2012.01) |
| *B60W 50/14* | (2012.01) |

(52) U.S. Cl.
CPC ............ *B60W 10/26* (2013.01); *B60W 20/10* (2013.01); *B60W 20/106* (2013.01); *B60W 30/182* (2013.01); *B60W 40/09* (2013.01); *B60W 50/14* (2013.01); *B60W 20/00* (2013.01); *B60W 2050/143* (2013.01); *B60W 2050/146* (2013.01); *B60W 2400/00* (2013.01); *B60W 2510/244* (2013.01); *B60W 2520/10* (2013.01); *B60W 2520/105* (2013.01); *B60W 2520/125* (2013.01); *B60W 2540/10* (2013.01); *B60W 2540/103* (2013.01); *B60W 2540/106* (2013.01); *B60W 2540/12* (2013.01); *B60W 2540/16* (2013.01); *B60W 2540/165* (2013.01); *B60W 2540/30* (2013.01); *B60W 2710/0677* (2013.01); *B60W 2710/086* (2013.01); *B60W 2710/244* (2013.01); *Y02T 10/6286* (2013.01); *Y10S 903/93* (2013.01)

(56) References Cited

U.S. PATENT DOCUMENTS

| | | |
|---|---|---|
| 2006/0048988 A1 | 3/2006 | Dreibholz et al. |
| 2011/0130901 A1 | 6/2011 | Mori et al. |
| 2011/0148614 A1 | 6/2011 | Wagner |
| 2011/0153127 A1* | 6/2011 | Weslati ............... B60W 50/085 701/22 |
| 2011/0166733 A1 | 7/2011 | Yu et al. |
| 2011/0172864 A1 | 7/2011 | Syed et al. |
| 2012/0143398 A1* | 6/2012 | Takeuchi ............. B60W 40/12 701/1 |
| 2012/0179342 A1* | 7/2012 | Noumura ............. B60W 10/06 701/54 |
| 2014/0350789 A1* | 11/2014 | Anker ................. B62D 15/025 701/41 |

FOREIGN PATENT DOCUMENTS

| | | |
|---|---|---|
| GB | 2483371 A1 | 7/2012 |
| JP | H06-038305 | 2/1994 |
| JP | 2000-247162 | 9/2000 |
| JP | 2004-108342 | 4/2004 |
| JP | 2006-076566 | 3/2006 |
| JP | 2006-076567 | 3/2006 |
| JP | 2008-168700 | 7/2008 |
| KR | 10-2010-0057374 | 5/2010 |
| WO | WO 2009/109821 A1 | 9/2009 |

* cited by examiner

High Level

Brake

LongA

LatA

KD

Counter

HYBRID ELECTRIC VEHICLE AND METHOD OF CONTROL THEREOF

RELATED APPLICATIONS

This application is a 35 U.S.C. §371 national stage application PCT Application No. PCT/EP2013/051342, filed on Jan. 24, 2013, which claims priority from Great Britain Patent Application No. 1201221.7, filed Jan. 25, 2012, the contents of which are incorporated herein by reference in their entireties. The above-referenced PCT International Application was published in the English language as International Publication No. WO 2013/110706 A1 on Aug. 1, 2013.

FIELD OF THE INVENTION

The present invention relates to hybrid electric vehicles and to a method of controlling a hybrid electric vehicle. Aspects of the invention relate to a controller, to a method and to a vehicle.

BACKGROUND

Hybrid electric vehicles (HEVs) differ from conventional motor vehicles in that they typically employ an electric machine operable as an electric motor in addition to an internal combustion engine in order to provide traction. HEVs are also typically equipped with a battery for storing electrical power for powering the electric machine.

In some HEVs the electric machine may also be employed as a generator under certain conditions. The electric machine may be powered by the internal combustion engine in order to generate electrical power to charge the battery.

It will be appreciated that HEVs represent a complex electrical-mechanical system the control of which is a non-trivial task. Considerable efforts have been made to develop controllers for HEVs that optimise the consumption of fuel by the engine in an effort to reduce the amount of carbon dioxide emitted by the vehicle during the course of a given drive cycle.

Some known parallel hybrid electric vehicles are configured to provide motive power to propel the vehicle by means of the engine only, the electric machine only or the engine and electric machine simultaneously. Peak performance figures in terms of torque delivered to the driveline are obtained by employing the engine and electric machine simultaneously. Use of the electric machine to provide torque to supplement that provided by the engine may be referred to as a 'torque boost' mode of operation.

It is to be understood that for each acceleration event in which the ICE and electric machine are used together, a significant amount of charge may be drained from the battery, reducing a state of charge (SoC) of the battery.

If acceleration events occur repeatedly in a relatively short space of time the state of charge of the battery may drop to a lower limit of its allowable operating range. This may render the electric machine incapable of producing motive torque. The absence of a torque boost contribution by the electric machine together with the added weight of electrical components associated with hybrid functionality cause a noticeable drop in vehicle performance.

In some known HEVs the problem of electric machine non-availability due to low battery SoC is resolved by providing a driver-selected hybrid-inhibit button which, when activated, prevents engine shutdown whilst the vehicle is being operated in order to recharge the battery as much as possible.

This solution, while protecting the performance figures, has a significant impact on fuel economy and vehicle emissions.

STATEMENT OF THE INVENTION

Aspects of the invention provide a hybrid electric vehicle and a method as claimed in the appended claims.

According to another aspect of the invention for which protection is sought, there is provided controller for a hybrid electric vehicle having a fuel powered engine and an electric motor operable to provide torque to drive the vehicle, an energy storage means operable to store electrical energy generated by a generator for driving the electric motor, the controller being arranged to control the engine and electric motor to provide torque to drive the vehicle and to control the generator to generate electrical energy for storage in the energy storage means, wherein the controller is further arranged to: monitor a value of one or more parameters associated with the vehicle; identify a current driving style of a driver in dependence on the value of the one or more parameters; and control the engine, electric motor and generator responsive to the driving style of the user.

The driving style may range from an economy-oriented driving style to a performance-oriented driving style.

In another aspect of the invention for which protection is sought there is provided a controller for a hybrid electric vehicle having an engine and at least one electric machine, at least one said at least one electric machine being operable as a propulsion motor to provide drive torque to drive the vehicle, and an energy storage means for storing electrical energy for powering the at least one electric machine as a propulsion motor, the controller being arranged to control the engine and at least one electric machine to provide torque to drive the vehicle in a hybrid vehicle (HV) mode in which the engine is switched on or an electric vehicle (EV) mode in which the engine is switched off, the controller being further arranged to: monitor a value of one or more parameters associated with the vehicle; identify a current driving style of a driver in dependence on the value of the one or more parameters; and control the engine and at least one electric machine to operate in the HV or EV modes in dependence on the driving style of the user.

The controller may be operable to control at least one said at least one electric machine to operate as a generator to generate electrical energy for storage in the energy storage means. In some embodiments, one electric machine may be provided operable by the controller as an electric propulsion motor or as an electric generator as required by the controller. The controller may determine whether to operate the electric machine as a propulsion motor or as a generator according to an energy management strategy implemented by the controller.

The driving style may range from an economy-oriented driving style to a performance-oriented driving style.

In a further aspect of the invention for which protection is sought there is provided a controller for a hybrid electric vehicle having an engine and at least one electric machine, at least one said at least one electric machine being operable as a propulsion motor to provide drive torque to drive the vehicle, and an energy storage means for storing electrical energy for powering the at least one electric machine as a propulsion motor, the controller being arranged to control the engine and at least one electric machine to provide torque to drive the vehicle in a hybrid vehicle (HV) mode in which the engine is switched on or an electric vehicle (EV) mode in which the engine is switched off, the controller being further arranged to: monitor a value of one or more parameters associated with the vehicle; identify a current driving style of a driver in dependence on the value of the one or more parameters; and control the engine and at least one electric machine to operate in the HV or EV modes in dependence on the driving style of the user.

The controller may be operable to control at least one said at least one electric machine to operate as a generator to generate electrical energy for storage in the energy storage means.

According to another aspect of the invention for which protection is sought there is provided a hybrid electric vehicle comprising: a fuel powered engine and electric motor means operable to provide torque to drive the vehicle; energy storage means operable to store electrical energy generated by generator means for driving the electric motor means; and energy management means for controlling the engine and electric motor means to provide torque to drive the vehicle and for controlling the generator means to generate electrical energy for storage in the energy storage means, wherein the vehicle comprises control means operable to monitor a value of one or more parameters associated with the vehicle, the control means being arranged automatically to identify a current driving style of a driver responsive to the value of the one or more parameters, the energy management means being operable to control the engine, electric motor means and generator means responsive to the driving style of the user.

Advantageously the electric motor means is operable to provide torque to drive the vehicle in parallel with the engine in a torque boost mode of operation, the energy management means being operable to control the engine, electric motor means and generator means responsive to the driving style of the user thereby to reduce a risk that the amount of energy stored in the energy storage means falls to a value preventing assumption of the torque boost mode.

Thus if the control means determines that the driver is driving in a performance-oriented style the control means may be configured to increase the amount of energy stored in the energy storage means so that the energy storage means has sufficient energy stored therein to power the electric motor means in parallel with the engine so as to provide the torque boost mode when required.

In contrast, if the driver is driving in an economy-oriented style the control means may be configured to control the vehicle to reduce an amount of undesirable gaseous emissions of the vehicle. In some arrangements this may involve allowing an amount of charge stored in the energy storage means to become depleted in order to reduce an amount of time for which the engine is switched on.

It is to be understood that the present inventors have recognised that one problem with known hybrid electric vehicles having an engine, electric motor and battery for powering the electric motor is that when the vehicle is driven aggressively the battery can become depleted to a level at which there is insufficient charge to support the torque boost mode. Thus if the driver repeatedly requests torque boost mode, for example by depressing the accelerator pedal by a substantial amount to request relatively high rates of acceleration, performance of the vehicle will deteriorate significantly after a relatively short period of time.

In contrast, in some embodiments of the present invention the control means is configured to detect that a driver is driving aggressively and to modify a control strategy thereby to prevent the amount of energy stored in the energy storage means from falling to a level that prevents torque boost mode from being assumed.

In an embodiment, the control means is operable to monitor a value of at least one of:
(a) a speed of rotation of the engine;
(b) a speed of rotation of the electric motor means;
(c) a speed of the vehicle;
(d) a longitudinal acceleration of the vehicle;
(e) a lateral acceleration of the vehicle;
(f) an accelerator pedal position;
(g) a state of an accelerator pedal kick-down detector;
(h) a brake pedal position;
(i) a gear ratio between the first or second actuator means and one or more wheels of
the vehicle;
(j) a proportion of an amount of a brake torque requested by the driver that is provided
by regenerative braking;
(k) an amount of energy stored in the energy storage means;
(l) a speed of at least one portion of a driveline of the vehicle; and
(m) an amount of positive drive torque,
thereby to identify the current driving style of the driver.

Advantageously the electric motor means and electric generator means may be provided by a single electric machine.

Thus the electric machine may be operated as an electric motor by supplying an electrical current thereto or as an electric generator by rotating a drive shaft of the motor.

The vehicle may comprise a plurality of electric machines.

Advantageously the control means may be operable to calculate a value of a driver behaviour index responsive to the driving style of a driver.

Further advantageously the control means may be configured to change the value of the driver behaviour index towards a first value when the driver displays an economy-oriented driving style and to change the value of the driver behaviour index towards a second value when the driver displays a performance-oriented driving style.

Advantageously the vehicle may be arranged to increase a target state of charge of the energy storage means as the value of the driver behaviour index tends towards the second value and to reduce the target state of charge of the energy storage means as the value of the driver behaviour index tends towards the first value.

This feature has the advantage that the vehicle is configured such that a risk that the state of charge of the energy storage means becomes insufficient to allow the torque boost mode of operation to be assumed is reduced.

The vehicle may be configured to change the value of the driver behaviour index towards the second value responsive to a value of longitudinal acceleration of the vehicle.

Advantageously the vehicle may be configured to change the value of driver behaviour index towards the second value when the value of longitudinal acceleration is more positive than an index increase positive threshold value being a positive acceleration value or is more negative than an index increase negative threshold value being a negative acceleration value.

It is to be understood that by negative acceleration is meant a deceleration of the vehicle.

The value of the index increase positive threshold value may be set to a value corresponding to relatively harsh acceleration by a driver, for example a value of acceleration requiring the vehicle to assume torque boost mode. Other arrangements are also useful.

The value of index increase negative threshold value may be set to a value corresponding to relatively harsh deceleration by a driver.

In some embodiments the driver behaviour index is changed towards the second value when the amount of brake torque demanded by the driver exceeds that which may be provided by regenerative braking means.

The vehicle may be configured to change the value of driver behaviour index towards the first value when the value of longitudinal acceleration is between an index decrease positive threshold value being a positive value and an index decrease negative threshold value being a negative value.

It is to be understood that the index decrease positive threshold value and index increase positive threshold value may be different values. The index increase positive threshold value may be more positive than the index decrease positive threshold value, for values of longitudinal acceleration between these values the control means may be arranged not to change the value of driver behaviour index responsive to the value of longitudinal acceleration.

Similarly, the index increase negative threshold value and index decrease negative threshold value may be different values, the index increase negative threshold value being more negative than the index decrease negative threshold value. For values of longitudinal acceleration between these values the control means may be arranged not to change the value of driver behaviour index responsive to the value of longitudinal acceleration.

The control means may be configured to prevent the value of driver behaviour index changing responsive to the value of longitudinal acceleration in dependence on a value of lateral acceleration.

Advantageously the control means may be configured to prevent the value of driver behaviour index changing responsive to the value of longitudinal acceleration when the value of lateral acceleration exceeds a prescribed value.

This feature has the advantage that if a driver is driving aggressively but the value of longitudinal acceleration is relatively low whilst cornering, the vehicle can determine that the vehicle is cornering and take this into account when determining whether the driver behaviour index should be allowed to decrease.

The vehicle may be configured to change the value of the driver behaviour index responsive to a relative amount of a demanded braking torque that is provided by regenerative braking.

The demanded braking torque may be a driver demanded braking torque.

The vehicle may be configured to change the value of the driver behaviour index towards the second value when the relative amount of a demanded braking torque that is provided by regenerative braking is below a prescribed amount.

The vehicle may be configured to change the value of driver behaviour index responsive to at least one selected from amongst brake pedal pressure, brake pedal position, rate of change of brake pedal pressure and rate of change of brake pedal position.

In some embodiments, in the event that a driver drives in such a manner that the amount of brake torque available through regenerative braking is insufficient to meet the driver demand for brake torque the control means may change the value of the driver behaviour index towards the second value.

The control means may be configured to change the value of the driver behaviour index towards the second value responsive to an average value of the relative amount of demanded braking torque provided by regenerative braking.

The average value may be a moving average value.

Advantageously the vehicle may be configured to change the value of the driver behaviour index responsive to at least one selected from amongst accelerator pedal position and a rate of change of accelerator pedal position.

Further advantageously the vehicle may be configured to change the value of the driver behaviour index responsive to activation of an accelerator pedal kick-down switch.

Optionally the vehicle is configured to change the value of the driver behaviour index responsive to a speed of the vehicle.

The vehicle may be configured to change the value of driver behaviour index responsive to one selected from amongst a selected gear of a transmission of the vehicle and a state of a performance mode selector.

By performance mode selector is included a selector such as a dynamic mode or sport mode selector or any other suitable selector.

The vehicle may be operable to latch the engine in an on condition responsive to the driving style of the driver.

Advantageously the vehicle may be operable to provide feedback to the driver responsive to the determination whether the driving style corresponds to a performance oriented driving style or an economy oriented driving style.

For example the vehicle may be operable to provide feedback to the driver as to whether stopping of the engine is being over-ridden, for example by latching the engine in an on condition, responsive to the driving style of the driver.

The vehicle may be operable to provide feedback by means of one selected from amongst visual indicator means, audible indicator means and haptic feedback means.

The visual indicator means may be provided by a display, a lamp, or any other suitable indicator means.

According to a further aspect of the invention for which protection is sought there is provided a method of controlling a hybrid electric vehicle having a fuel powered engine and electric motor means operable to provide torque to drive the vehicle, energy storage means operable to store electrical energy generated by generator means for driving the electric motor means; and energy management means for controlling the engine and electric motor means to provide torque to drive the vehicle and for controlling the generator means to generate electrical energy for storage in the energy storage means, the method comprises monitoring by control means a value of one or more parameters associated with the vehicle and identifying automatically a current driving style of a driver responsive to the value of the one or more parameters, the method further comprising controlling the engine, electric motor means and generator means responsive to the driving style of the user.

According to a still further aspect of the invention there is provided a hybrid electric vehicle having: a plurality of actuators each operable to develop power to drive the vehicle, at least one of the actuators being operable to deliver torque to a driveline of the vehicle; energy storage means for storing energy generated by one or more of the actuators; and control means, the control means being operable to control the plurality of actuators to provide power to drive the vehicle and to store energy in the energy storage means, the control means being arranged to control the actuators to provide power to drive the vehicle responsive to a value of driver demanded torque, the control means being further operable to control the actuators responsive to a driving style of the driver, the driving style being determined by monitoring one or more parameters associated with the vehicle whilst it is being driven by the driver.

The control means may be arranged to control the actuators to increase an amount of energy stored in the energy storage means response to the driving style of the driver.

This feature has the advantage that when a driver adopts a driving style that causes the amount of energy stored in the energy storage means to become depleted, the control means may respond by increasing the amount of energy stored in the energy storage means in order to allow the vehicle to maintain expected performance levels.

The monitored parameters may include vehicle speed, engine speed, an acceleration such as a lateral acceleration and/or a longitudinal acceleration, a position of one or more of a brake or accelerator (or throttle) control of the vehicle, a rate of change of a position of one or more of the brake or accelerator control, a driver-initiated brake pedal pressure, a selected gear of a transmission of the vehicle and a state of a performance mode selector.

The controller may be operable to determine a required torque split between the plurality of actuators responsive to a plurality of operating parameters of the vehicle, the torque split being a proportion of the total torque that is to be provided to the driveline by each actuator.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
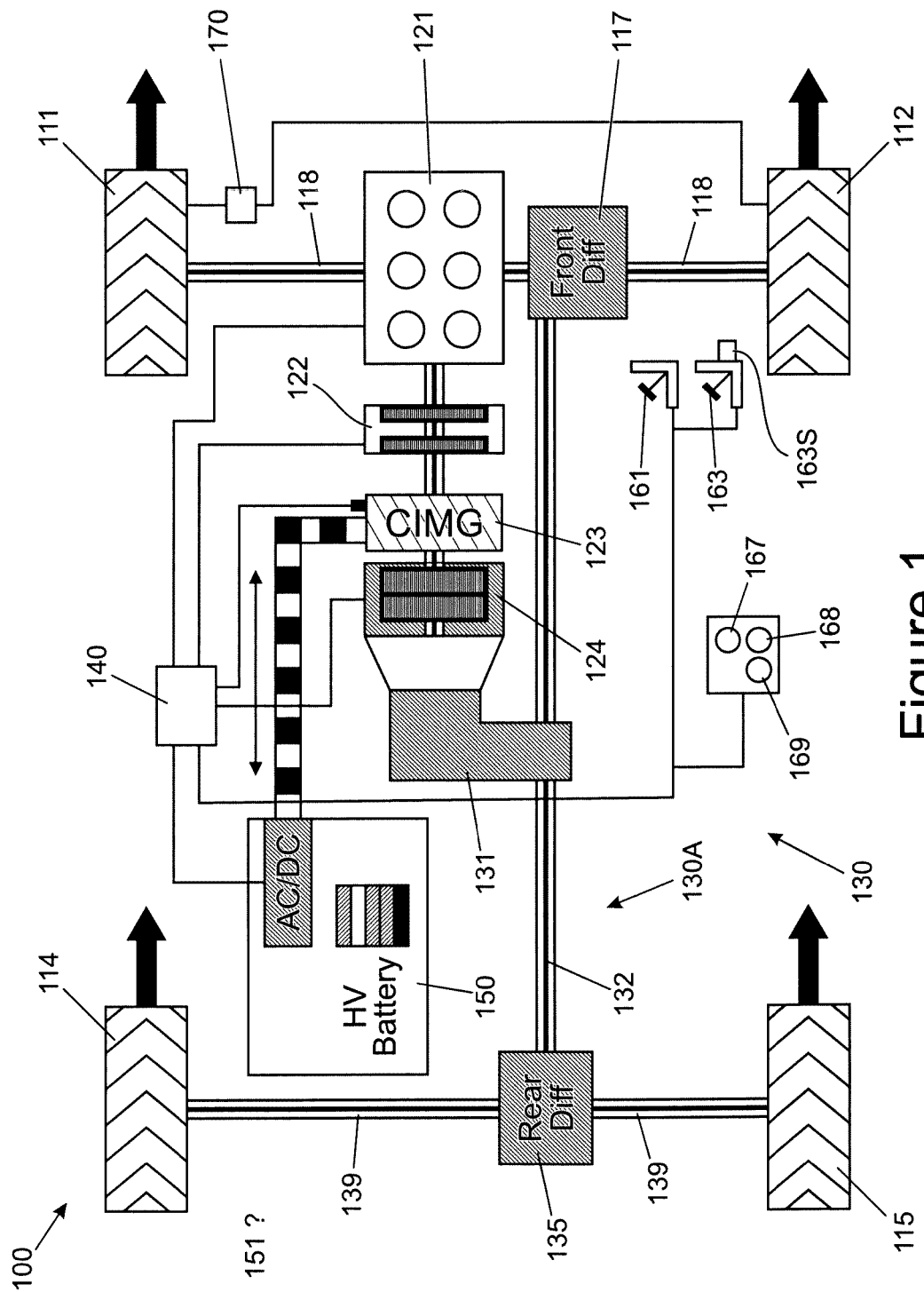
FIG. 1 is a schematic illustration of a hybrid electric vehicle (HEV) according to an embodiment of the invention.

In one embodiment of the invention a parallel-type hybrid electric vehicle (HEV) 100 is provided as shown in FIG. 1. The vehicle 100 has an internal combustion engine 121 releasably coupled to a crankshaft integrated motor/generator (CIMG) 123 by means of a clutch 122. The CIMG 123 is in turn coupled to an automatic transmission 124. The vehicle 100 is operable to provide drive torque to the transmission 124 by means of the engine 121 alone, the CIMG 123 alone or the engine 121 and CIMG 123 in parallel.

It is to be understood that in some embodiments the transmission 124 may be a manual transmission instead of an automatic transmission. The transmission may comprise a manual gearbox, a continually variable transmission or any other suitable transmission.

The transmission 124 is connected to a driveline 130 arranged to drive a pair of front wheels 111, 112 of the vehicle 100 by means of a front differential 117 and a pair of front drive shafts 118. The driveline 130 also comprises an auxiliary driveline 130A arranged to drive a pair of rear wheels 114, 115 by means of auxiliary driveshaft 132, a rear differential 135 and a pair of rear driveshafts 139.

It is to be understood that embodiments of the present invention are suitable for use with vehicles in which the transmission 124 is arranged to drive only a pair of front wheels 111, 112 or only a pair of rear wheels 114, 115, i.e. front wheel drive or rear wheel drive vehicles in addition to all wheel drive or selectable two wheel drive/four wheel drive vehicles. Embodiments of the invention are also suitable for vehicles having less than four wheels or more than four wheels.

The vehicle 100 has a battery 150 connected to an inverter 151 that generates a three-phase electrical supply that is supplied to the CIMG 123 when the CIMG 123 is operated as a motor. The battery 150 is arranged to receive charge from the CIMG 123 when the CIMG 123 is operated as a generator.

The vehicle 100 has a brake pedal 161, an accelerator pedal 163, a transmission selector control 167 and an 'attribute mode' or 'special programs' (SP) mode selector 168.

The transmission selector control 167 is operable to select a required mode of operation of the transmission selected from amongst (1) a park mode in which the transmission is disengaged from the engine 121 and a parking lock is applied to one of the wheels 111, 112, 114, 115; (2) a reverse mode in which the vehicle 100 may be driven in a reverse direction; (3) a neutral mode in which the transmission is disengaged from the engine and no parking lock is applied; (4) a drive mode in which the vehicle may be driven in a forward direction in any one of eight forward gears; and (5) a sports mode.

The vehicle 100 is configured to operate in either one of a hybrid electric vehicle (HEV) mode, a HEV inhibit mode and a selectable electric vehicle only (EV-only) mode according to the state of a HEV mode selector 169.

In the HEV mode of operation the vehicle 100 is arranged to operate either in a 'parallel' mode with the engine 121 and CIMG 123 both connected to the transmission 124 (i.e. clutch 122 is closed) or in a vehicle-selected EV mode. In the vehicle-selected EV mode (and in the driver selected EV-only mode) the clutch 122 is opened and the engine 121 is switched off.

When the vehicle 100 is in the HEV mode the vehicle 100 is configured automatically to determine whether to operate with the engine 121 switched on or off. When in HEV mode and the vehicle has selected automatically to switch the engine 121 off (and operate in the vehicle-selected EV mode), restarting of the engine 121 is controlled according to a value of driver demanded torque and a state of charge (SoC) of the battery 150 although other arrangements are also useful.

If the driver selects operation of the vehicle 100 in EV-only mode and the engine 121 is running, the vehicle 100 is configured to open the clutch 122 and to switch off the engine 121. Again, the CIMG 123 is then operated either as a motor or as a generator. It is to be understood that the CIMG 123 may be arranged to act as a generator in the EV-only mode in order to effect regenerative braking of the vehicle 100.

The vehicle 100 has a controller 140 arranged to control the vehicle 100 to switch the engine 121 on and off when in HEV mode according to an energy management strategy.

The controller 140 is also operable to modify the energy management strategy according to driver behaviour. In order to accomplish this the controller 140 monitors driver behaviour and determines a value of a driver behaviour evaluation index (also referred to herein as driver evaluation index) 260 responsive to the driver's behaviour.

In some embodiments the controller 140 may be arranged to over-ride shutdown of the engine 121 in the event that the value of the driver evaluation index 260 exceeds a prescribed value. The controller 140 is so arranged in order to reduce a risk that the battery SoC falls to a level at which the CIMG 123 is unable to provide torque to the driveline 130 in the torque boost mode.

Figure 2:
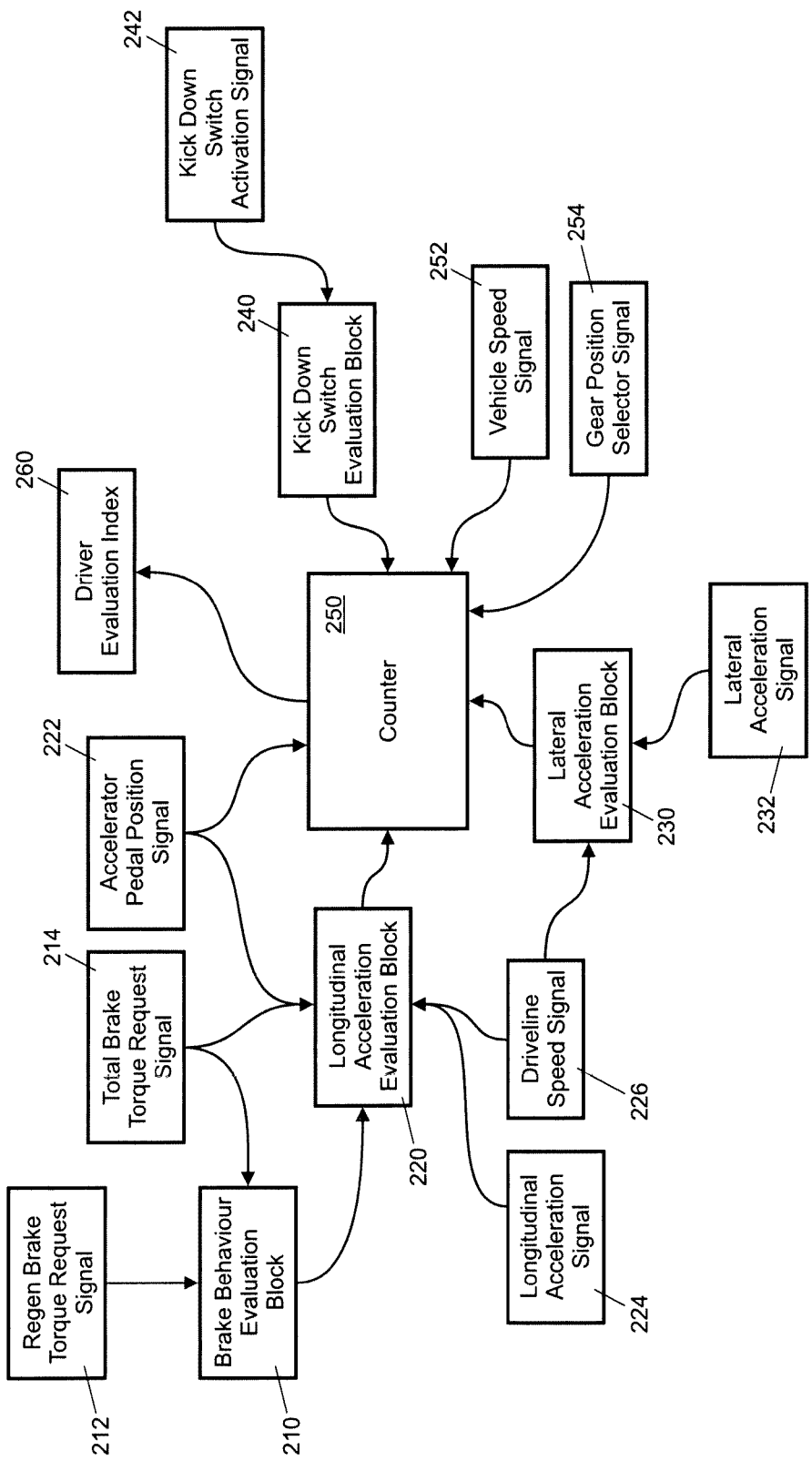
FIG. 2 is a schematic diagram showing parameters associated with a vehicle controller arranged to determine a value of a driver behaviour evaluation index.

FIG. 2 represents a flow diagram of a process in which the controller 140 determines a value of the driver evaluation index 260 responsive to driver behaviour. Reference herein to a block such as a function block is to be understood to include reference to software code for performing the function or action specified in which an output is provided responsive to one or more inputs. The code may be in the form of a software routine or function called by a main computer program, or be code forming part of a flow of code not being a separate routine or function. Reference to function block is made for ease of explanation of the manner of operation of the controller.

As shown in FIG. 2, a brake behaviour evaluation block 210 is arranged to receive a regenerative braking torque request signal 212 and a total brake torque request signal 214 from a brake controller 170 that is arranged to control operation of a brake of each of four wheels 111, 112, 114, 115 of the vehicle 100. In the embodiment of FIG. 1 the brake controller 170 is an anti-lock braking system (ABS) controller 170.

The total brake torque request signal 214 is a signal responsive to an amount by which the brake pedal 161 is depressed, representing the total amount of braking torque requested by the driver. In some embodiments the total brake torque request signal 214 is a signal responsive to an amount of a driver-initiated increase in brake pressure due to depression of the brake pedal 161. Other means for measuring a total amount of braking torque requested by the driver are also useful.

The regenerative braking torque request signal 212 is a signal indicative of the amount of the total braking force provided by the vehicle 100 in the form of regenerative braking. By regenerative braking is meant braking force in the form of negative torque that is applied to the driveline 130 by the CIMG 123 when it is employed as a generator. Other means for generating useful energy by inducing deceleration of the vehicle 100 are also useful.

The brake behaviour evaluation block 210 is arranged to calculate a value of a brake evaluator gain signal 210K (FIG. 3) based on the regenerative and total brake torque request signals 212, 214 and to feed the value of the gain signal 210K to a longitudinal acceleration evaluation block 220. It is to be understood that the brake behaviour evaluation block 210 is configured such that the smaller the proportion of total braking torque provided by regenerative braking, the more aggressive the braking event is determined to be. The value of gain signal 210K is therefore arranged to increase as the proportion of total braking torque provided by regenerative braking decreases. Operation of the brake behaviour evaluation block 210 is described in more detail below.

The longitudinal acceleration evaluation block 220 receives the brake evaluator gain signal 210K from the brake behaviour evaluation block 210 and the total brake torque request signal 214 from the brake controller 170. In addition it receives a longitudinal acceleration signal 224 being a signal responsive to a value of longitudinal acceleration of the vehicle 100, a driveline speed signal 226 being a signal responsive to a speed of a portion of the driveline 130 of the vehicle 100 and an accelerator pedal position signal 222 responsive to a position of the accelerator pedal 163. The block 220 is arranged to output a value of a longitudinal acceleration counter increment 225 (FIG. 4) to a driver evaluator counter function block 250, the counter increment value 225 being responsive to the brake evaluator gain signal 210K, the total brake torque request signal 214, the longitudinal acceleration signal 224, the driveline speed signal 226 and the accelerator pedal position signal 222.

It is to be understood that reference to a speed of a portion of the driveline 130 of the vehicle 100 may include reference to one or more of a speed of an input shaft of the transmission 124, a speed of an output shaft of the transmission 124, a speed of a drive shaft such as an auxiliary driveshaft 130A, a front driveshaft 118 or a rear driveshaft 139, a speed of one or more wheels 111, 112, 114, 115 or any other suitable portion of the driveline 130.

Figure 5:
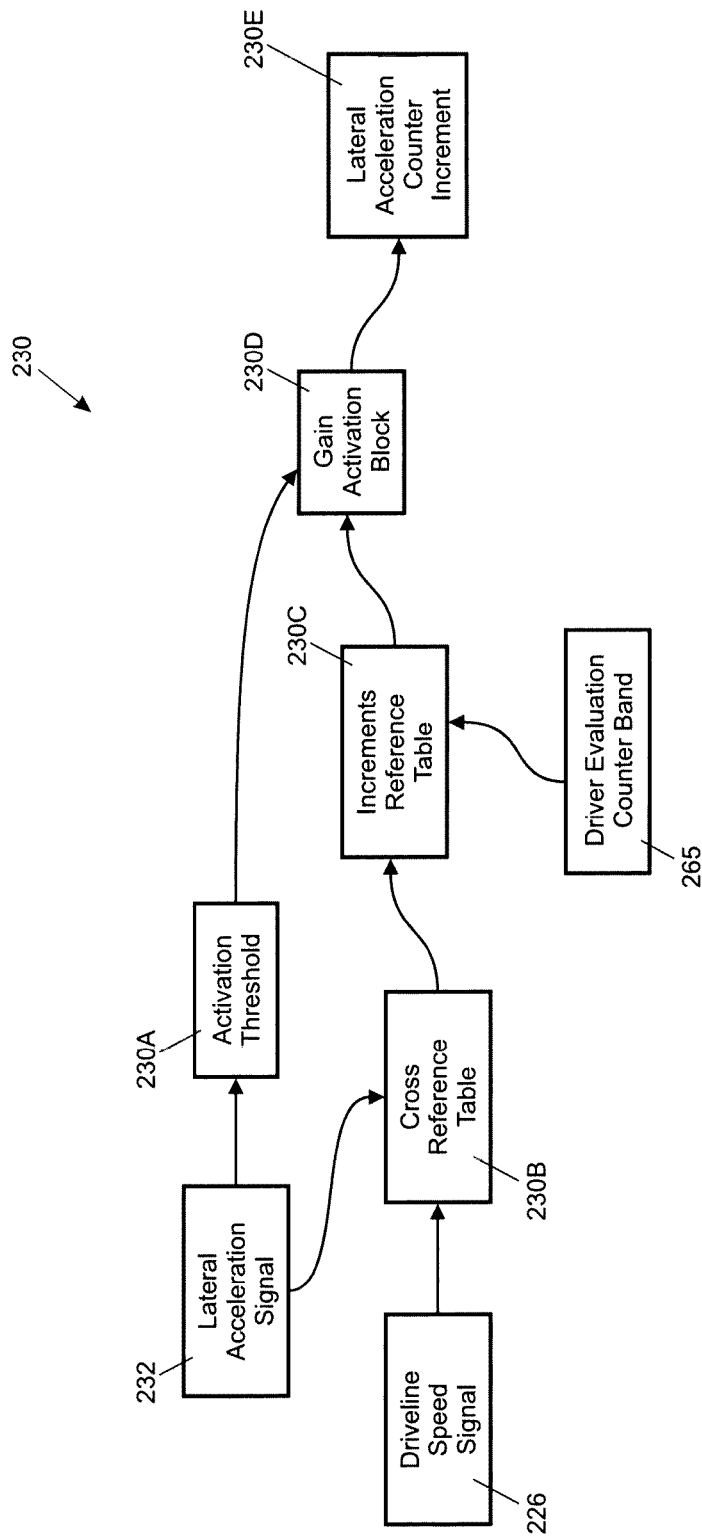
FIG. 5 is a schematic diagram of a lateral acceleration evaluation block of the controller of FIG. 2 showing steps in processing a lateral acceleration input signal.

A lateral acceleration evaluation block 230 is also provided and is arranged to calculate a lateral acceleration counter increment value 230E (FIG. 5). Evaluation block 230 arranged to receive the driveline speed signal 226 and in addition a lateral acceleration signal 232 being a signal responsive to a value of lateral acceleration experienced by the vehicle 100. The lateral acceleration evaluation block 230 is arranged to calculate the value of the lateral acceleration counter increment value 230E responsive to the driveline speed signal 226 and lateral acceleration signal 232.

A kick-down switch evaluation block 240 is arranged to calculate a value of a kick-down increment or kick-down behaviour index 240E (FIG. 6) responsive to a kick-down switch activation signal 242. The kick-down switch activation signal 242 is a signal the value of which is responsive to whether a driver has depressed the accelerator pedal 163 by an amount sufficient to activate a kick-down switch 163S. In the embodiment of FIG. 1 the kick-down switch 163S is arranged to be activated when the accelerator pedal 163 is fully depressed. In some arrangements the kick-down switch 163S is arranged to be activated when the accelerator pedal 163 is depressed by a smaller amount, for example by 95% or more of its full travel. Other arrangements are also useful.

As shown in FIG. 2, a vehicle speed signal 252 being a signal having a value responsive to a speed of the vehicle 100, a gear position selector signal 254 having a value responsive to a gear position selected by the vehicle 100 and the accelerator pedal position signal 222 are also fed to the driver evaluator counter function block 250. The counter function block 250 is arranged to calculate a value of the driver evaluation index value 260 responsive to the values of signals and indexes input thereto.

The value of the driver evaluation index value 260 is output to an energy management portion of the controller 140. The controller 140 is operable to control operation of the vehicle responsive to the value of the driver evaluation index value 260 as will be described in more detail below.

Figure 3:
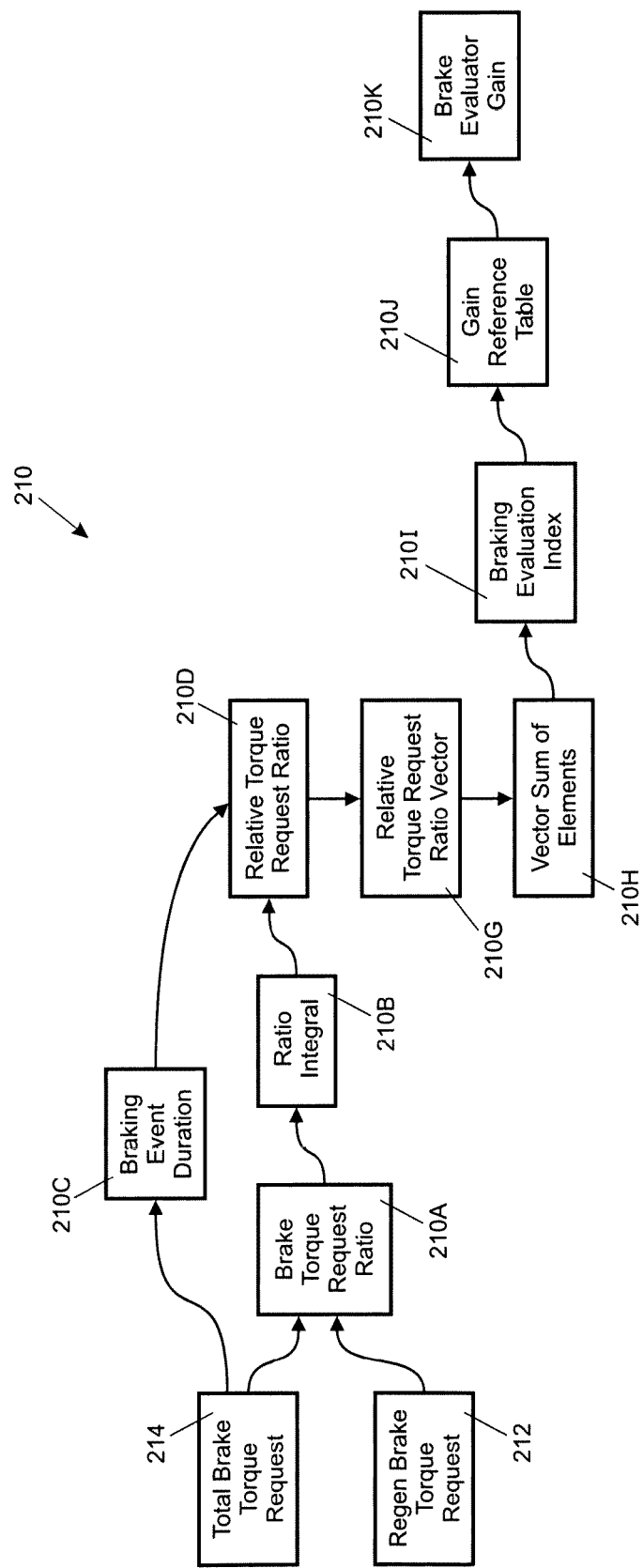
FIG. 3 is a schematic diagram of a braking behaviour evaluation block of the controller of FIG. 2.

FIG. 3 is a schematic representation of a manner of operation of the braking behaviour evaluation block 210 illustrating how the block 210 calculates a value of the brake evaluator gain signal 210K.

The total brake torque request signal 214 and regenerative braking torque request signal 212 input to the block 210 are combined to determine a brake torque request ratio value 210A being the ratio of the values of the respective signals 212, 214. The ratio value 210A is calculated by dividing the total brake torque requested by the vehicle 100 (due to a driver brake command) by the regenerative brake torque requested by the vehicle 100 in response to the driver brake command. It is to be understood that the signal 210A, which is always greater than unity, is therefore responsive to the proportion of braking energy that is captured and stored in the battery 150 at a given moment in time.

It is to be understood that braking events are typically unpredictable and uneven in duration. Accordingly, an integral 210B of the brake torque request ratio value 210A is determined and divided by the value of a braking event duration signal 210C being a signal responsive to the duration of a given braking event in order to determine a relative torque request ratio value 210D.

The relative torque request ratio value 210D is fed to a relative torque request ratio vector function block 210G.

The vector function block 210G is configured to store in a memory a predetermined number of consecutive values of the relative torque request ratio value 210D. In the present embodiment the function block 210G stores the five most recent values.

When a new value 210D becomes available, following a braking event, the oldest value is deleted and the new value 210D is stored in the memory. It is to be understood that operation of the vector function block 210G is therefore similar to that of a shift register.

It is to be understood that the values of relative torque request ratio value 210D stored by the function block 210G are representative of the braking behaviour of the driver over a series of braking events and are therefore useful in characterising driver behaviour.

The torque request ratio vector 210G is fed to a vector sum function block 210H which sums the elements of the vector 210G and divides the sum by the number of elements to determine a brake evaluation index value 2101. It is to be understood that the index value 2101 is a value that is responsive to a moving average value of the relative torque request ratio.

The brake evaluation index value 2101 is mapped onto a gain reference table 210J to extract a value of brake evaluator gain 210K. The brake evaluator gain value 210K is provided by the braking behaviour evaluation block 210 to the longitudinal acceleration evaluation block 220.

Figure 4:
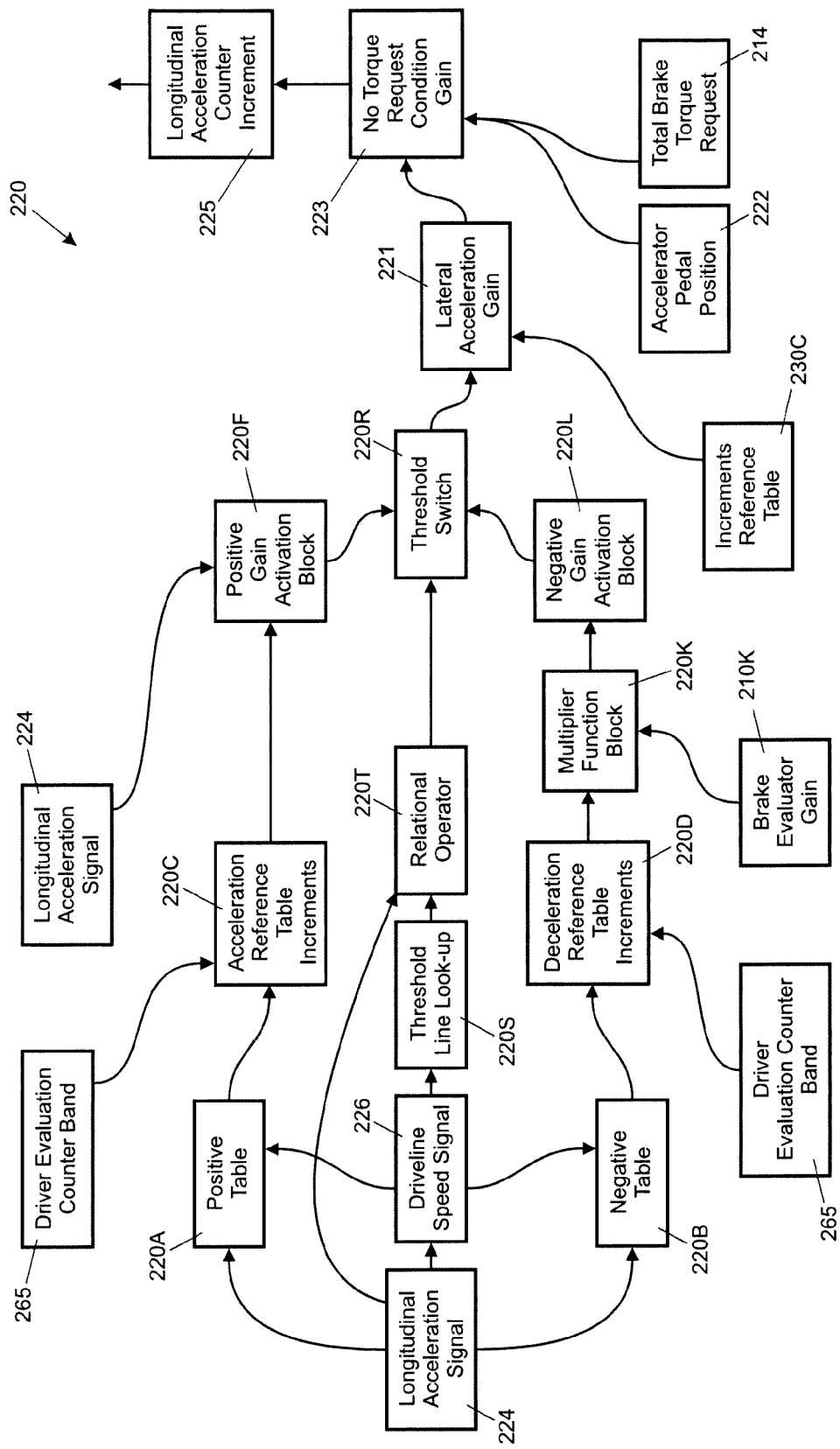
FIG. 4 is a schematic diagram of a longitudinal acceleration evaluation block of the controller of FIG. 2 showing steps in processing of acceleration and speed signals.

FIG. 4 is a schematic representation of a manner of operation of the longitudinal acceleration evaluation block 220. The longitudinal acceleration signal 224 is received by the block 220.

The signal 224 together with the driveline speed signal 226 is then input to a positive table function block 220A and to a negative table function block 220B.

The positive table function block 220A is configured to determine a reference index value from a dataset relating the value of the longitudinal acceleration signal 224 to the value of the driveline speed 226. The reference index is output to an acceleration reference table increments function block 220C. Increments function block 220C is arranged to output to a positive gain activation function block 220F a suggested increment of the longitudinal acceleration index value, depending on the reference index value output by the positive table function block 220A and a current value of a driver evaluation counter band signal 265.

It is to be understood that the value of driver evaluation counter band 265 indicates which one of four ranges or 'bands' of values of driver evaluation index 260 the current value of the index 260 falls within. Thus the value of counter band 265 identifies a particular range of values within which the value of the evaluation index 260 falls. In some embodiments the value of counter band indicates which one of a different number of ranges of values the current value of the index 260 falls within such as 2, 3, 5, 6, 7, 8, 9, 10 or more ranges.

In the present embodiment the driver evaluation index 260 is arranged to assume a value between 1 (corresponding to non-aggressive behaviour) to 200 (corresponding to highly aggressive behaviour). Other ranges of values are also useful. The value of counter band 265 is set to a value 0 if the value of evaluation index 260 is from 1 to 50, to a value of 1 if the value of evaluation index 260 is from 51 to 100, to a value of 2 if the evaluation index 260 is from 101 to 150 and to a value of 3 if the evaluation index 260 is from 151 to 200. Other ranges for the counter bands are also useful.

Thus it is to be understood that the positive table function block 220A and acceleration reference table increments function block 220C allow mapping of three input signals (longitudinal acceleration 224, driveline speed 226 and driver evaluation counter band 265) onto a single output which is fed to the positive gain activation block 220F. Thus, the output fed to gain activation block 220F and ultimately the value of longitudinal acceleration counter increment 225 output to the counter function block 250 are both responsive to these three input signals.

It is to be understood that the value fed to the positive gain activation block 220F by increments function block 220C may be arranged to be less for counter band values representing higher values of evaluation index 260 than for bands representing lower values.

Thus, for counter bands representing lower values of evaluation index 260 the value fed to the positive gain activation block 220F may be arranged to cause a more rapid rise in evaluation index 260 for a given value of longitudinal acceleration and driveline speed 226 compared with that for counter bands representing higher values of evaluation index 260.

As noted above the positive gain activation function block 220F receives as an input the output of the acceleration reference table increments function block 220C and in addition the value of a longitudinal acceleration signal 224. Function block 220F is configured to output the value input from function block 220C for a prescribed period of time to a threshold switch function block 220R.

Function block 220F integrates the duration of each acceleration event so that if an event lasts longer than the prescribed period, function block 220F sets the value of the output thereof to zero. This feature has the effect that an amount by which the value of driver evaluation index 260 can increase over a given acceleration event is not limited to a particular value whilst the acceleration event is taking place. However, the period during which the value of the evaluation index 260 can increase during a single acceleration event is limited. This functionality allows for greater flexibility in the calibration of the amount by which the evaluation index 260 can increase. In some arrangements the contribution of specific signal values to the value of evaluation index 260 may therefore be arranged to vary according to the point at which that they occur during the event.

In one embodiment, function block 220F passes to the threshold switch 220R the increments value input to it from function block 220C for a prescribed period, such as a period of 5 s. However the function block 220F subsequently passes half the value input to it from function block 220C for a further prescribed period.

In other words, for the initial period of 5 s function block 220F allows through 100% of the value input to it, and then for a subsequent period of 5 s it allows through 50% of the value input to it. If the acceleration event continues beyond 10 s the function block sets the increment value to zero effectively freezing the contribution to the value of driver evaluation index 260 made by the longitudinal acceleration evaluation block 220 during a given acceleration event.

Other arrangements are also useful such as other prescribed periods of time and other relative amounts of increment value passed by function block 220F.

For the avoidance of doubt it is to be understood that a given acceleration event is defined by the period of time for which the value of longitudinal acceleration rises above a threshold value before falling back below a threshold value. The threshold value above which a longitudinal acceleration event is considered to commence may be the same as or different from that below which the event is considered to end. In some embodiments the threshold value above which the event is considered to commence may be greater than that below which it is considered to end thereby to prevent chattering.

Other arrangements are also useful.

Reference to a given positive longitudinal acceleration event is to be understood to be reference to a period during which a sensor detects that a value of longitudinal acceleration is positive and exceeds a prescribed positive threshold value.

The negative table function block 220B is configured to determine a reference index value responsive to the longitudinal acceleration signal 224 and driveline speed signal 226. The reference index value is output to a deceleration reference table increments function block 220D. Increments function block 220D is arranged to output to a multiplier function block 220K a suggested value of the longitudinal acceleration counter increment 225 based on the value output by the negative table function block 220B and the value of driver evaluation counter band 265. Thus the value output by increments function block 220D is a function of longitudinal acceleration signal 224, driveline speed signal 226 and the value of the driver evaluation counter band 265.

If the suggested value output by increments function block 220D is positive, indicating aggressive braking, the value is multiplied by the brake evaluator gain value 210K (FIG. 3) obtained from the brake behaviour evaluation block 210 as described above and output to a negative gain activation block 220L. The purpose of the multiplication is to increase the suggested value in order to compensate for repetitive loss of energy due to actuation of friction brakes.

A consequence of the increase in suggested value is that it is more likely that the value of driver evaluation index 260 will rise (or at least, not fall) responsive to the aggressive braking event. In some embodiments this has the effect that the vehicle is more likely to compensate for energy lost to friction brakes (and not recovered in a regenerative braking operation) by increasing the amount of energy stored in the battery 150 through operation of the engine 121.

If the suggested value output by the increments function block 220D is not positive the value is passed by the multiplier function block 220K to the negative gain activation block 220L unchanged.

As noted above it is to be understood that the suggested value output by function block 220D may be negative, indicating that the longitudinal acceleration evaluation function block 220 has determined that the value of driver evaluation index 260 should be decreased responsive to the values of parameters input to it.

In the present embodiment the deceleration reference table increments function block 220D is the only function block that may suggest a decrease in the value of the driver evaluation index 260. Other arrangements in which other function blocks may also suggest a decrease are also useful.

Negative gain activation block 220L is arranged to integrate the value input to it for the duration of each braking event. Whilst the value of the integral of the input is below a prescribed value the output of the activation block 220L (provided to a threshold function block 220R) corresponds to the value input to it from the multiplier function block 220K. However once the integrated value exceeds the prescribed value the value output by the activation block 220L is set to zero. This feature limits the effect that a single negative acceleration event can have on the value of driver evaluation index.

Reference to a negative acceleration event (i.e. a deceleration event) is to be understood to be reference to a period during which a sensor detects that a value of longitudinal acceleration is below a prescribed threshold indicating that the longitudinal acceleration is sufficiently negative.

It is to be further understood that whilst the negative gain activation block 220L places a limit on the amount by which the driver evaluation index 260 can increase for a given deceleration event, no limit is placed on the amount by which the value of driver evaluation index 260 can decrease.

This is so as to allow a smooth, continuous decrease in the value of driver evaluation index 260 when the driver behaviour merits a decrease. Other arrangements are also useful.

The threshold function block 220R is arranged to output to a lateral acceleration gain function block 221 the value input to it from the positive or negative gain activation blocks 220F, 220L responsive to an input from a relational operator function block 220T.

The relational operator function block 220T receives as input signals the longitudinal acceleration signal 224 and an output of a threshold line look-up function block 220S. The threshold line look-up function block 220S receives in turn the driveline speed signal 226.

Function block 220S outputs to the relational operator function block 220T a value of a vehicle acceleration parameter determined by reference to a look-up table responsive to the value of the driveline speed signal 226.

The relational operator function block 220T is arranged to control the threshold switch 220R to allow the output of the positive gain activation function block 220F or the output of the negative gain activation function block 220L to be passed to the lateral acceleration gain function block 221. This functionality is achieved by comparing the longitudinal acceleration signal 224 to the vehicle acceleration parameter determined by function block 220S.

In the embodiment described the output of the positive gain activation function block 220F is passed to the lateral acceleration gain function block 221 if the value of the longitudinal acceleration signal 224 is greater than the vehicle acceleration parameter.

In the case that the longitudinal acceleration signal 224 is less than the vehicle acceleration parameter, the output of the negative gain activation block 220L is passed to the lateral acceleration gain function block 221.

It is to be understood that the value of acceleration parameter is arranged such that whilst the vehicle 100 is cruising (and longitudinal acceleration is substantially zero), the threshold switch function block 220R passes the output of the negative gain activation function block 220L to the lateral acceleration gain function block 221, the output of the negative gain activation function block 220L being negative. Thus the longitudinal acceleration counter increment value 225 is also more likely to be negative, increasing the likelihood of a decrease in the value of the driver behaviour index 260.

Similarly, if the driver performs a light braking action the function block 220 is arranged whereby the negative gain activation function block 220L also passes a negative value of increment through the threshold switch 220R.

If the driver performs medium braking, in which regenerative braking is able to supply the required total brake torque demanded, the output of the negative gain activation block 220L is set such that the counter increment value 225 will most likely be zero.

For relatively heavy braking where friction brake torque is required in addition to regenerative brake torque, the output of the deceleration reference table increments function block 220D (and therefore the negative gain activation block 220L) is set to a positive value such that the counter increment value 225 will most likely be positive, indicating that the value of behaviour index 260 should be increased.

It is to be understood that in some embodiments, the output of the negative gain activation function block 220L is the only means by which a decrease in driver behaviour index 260 may be induced by the controller 140.

In some embodiments, the value of driver behaviour index 260 may be increased or decreased in the event the driver selects a different operating mode of the transmission. For example if sport mode (or 'dynamic mode') is selected the value of behaviour index 260 may be increased by a prescribed amount. If the sport mode is deselected the value of behaviour index 260 may be decreased by a prescribed amount. Other arrangements are also useful.

The lateral acceleration gain function block 221 outputs to a torque request condition gain function block 223 the value input to it from the threshold function block 220R. However the function block 221 is arranged such that if the value output by an increments reference table 230C of the lateral acceleration evaluation block 230 is non-zero the output of the lateral acceleration is frozen. That is, it is not allowed to decrease or to increase. Thus in these circumstances the lateral acceleration gain function block 221 prevents the value output by if from falling below zero.

By way of example, if a driver is driving aggressively and negotiates a tight bend without accelerating the vehicle aggressively parallel to its longitudinal axis, the longitudinal acceleration evaluation block does not mistakenly determine the driver is driving less aggressively simply because the vehicle 100 is not experiencing significant longitudinal acceleration. Rather, the vehicle 100 detects that the vehicle 100 is cornering with a value of lateral acceleration above a prescribed threshold (lateral acceleration increments reference table outputs a non-zero value) and freezes the value of longitudinal acceleration counter increment 225.

Thus the gain function block 221 is arranged to prevent the value of driver behaviour index 260 from falling when the vehicle 100 is negotiating a corner, where the vehicle 100 experiences high lateral acceleration but little or no longitudinal acceleration.

The torque request condition gain function block 223 also has as an input the accelerator pedal position signal 222 and total brake torque request signal 214. Function block 223 is arranged to output to the counter function block 250 the value input to it from the lateral acceleration gain function block 221 as a longitudinal acceleration counter increment 225. However if the function block 223 determines that the driver has taken his foot off the accelerator pedal 163 without depressing the brake pedal 161 (i.e. the vehicle is coasting), the function block sets the value of longitudinal acceleration counter increment 225 outputted by it to zero. This has the effect of preventing a decrease in the value of driver behaviour index 260 in response to an output from the longitudinal acceleration evaluation block 220.

It is to be understood that this feature has the advantage that if the vehicle 100 is being driven aggressively and approaches an intersection such as a roundabout, the driver may 'coast' with neither the accelerator pedal 163 nor brake pedal 161 depressed whilst negotiating the roundabout. If the value of the driver behaviour index 260 is high, the engine 121 will remain switched on whilst the vehicle 100 coasts, By preventing a decrease in driver behaviour index 260 during coasting, which might result in the engine 121 being switched off, the driver will enjoy a faster response when he subsequently accelerates away from the intersection.

In addition, if a driver is momentarily unsure how to proceed during the course of a drive cycle and hesitates such that neither the accelerator pedal 163 nor brake pedal 161 are depressed, the value of longitudinal acceleration counter increment 225 does not decrease, indicating less aggressive driver behaviour. This has the advantage that in some situations the vehicle 100 may respond more quickly to a request by the driver for delivery of a relatively high level of torque following a hesitation or 'change of mind' event in which the driver hesitates with his foot off the accelerator and brake pedals 163, 161 before depressing the accelerator pedal 163.

In some embodiments and situations the vehicle 100 may respond more quickly in embodiments of the invention because the engine 121 has remained switched on during the period of hesitation or change of mind. In some embodiments and situations this may be because the engine 121 has remained switched on and has been employed to charge the battery 150 so that the battery 150 has a sufficiently high SoC to allow the CIMG 123 to provide torque assist functionality upon request, following the driver hesitation.

FIG. 5 is a schematic representation of a manner of operation of the lateral acceleration evaluation block 230. The driveline speed signal 226 and lateral acceleration signal 232 are both input to a cross reference table function block 230B that provides an output responsive to the values input thereto. This output is provided to an increments reference table function block 230C that has as an input the driver evaluation counter band value 265. Function block 230C provides an output to a gain activation function block 230D responsive to the value input to it from the cross reference table function block 230B and the driver evaluation counter band value 265. It is to be understood that the cross reference table function block 230B and increments reference table function block 230C are arranged to allow mapping of the driveline speed signal 226, lateral acceleration signal 232 and driver evaluation counter band value 265 to a suggested value of required lateral acceleration counter increment value 230E.

The gain activation function block 230D also receives as an input a signal from an activation threshold function block 230A which in turn has as an input the lateral acceleration signal 232.

The activation threshold function block 230A together with the gain activation function block 230D are arranged such that if the value of the lateral acceleration signal 232 input to function block 230A exceeds a prescribed threshold value, the suggested value of required lateral acceleration counter increment value output by the increments reference table function block 230C is output by the gain activation block 230D as the lateral acceleration counter increment value 230E.

Whilst the gain activation block 230D is outputting the value input to it by the increments reference table function block 230C, block 230D is arranged to integrate the value input to it by function block 230C.

The gain activation block 230D continues to output the value input to it by function block 230C until the integral of this value over a given lateral acceleration event (being a period for which the lateral acceleration signal exceeds the prescribed value) exceeds a threshold value. Once the integral exceeds the threshold value the value of lateral acceleration counter increment value 230E output by activation block 230D is set to zero.

In some embodiments the gain activation block 230D is arranged to set the value of lateral acceleration counter increment 230E to zero after a prescribed period has elapsed since the activation threshold function block determined that the value of lateral acceleration signal 232 exceeded the prescribed threshold, regardless of whether the integral of the output of function block 230C exceeds the threshold value.

In some embodiments, the gain activation block 230D is arranged to integrate 100% of the value input from function block 230C for a prescribed period (such as 2 s) and then 50% of the value input to it for a further prescribed period (such as 3 s) and then to set the output of gain activation block 230D to zero unless the integrated value of the signal input from function block 230C exceeds the prescribed value before expiry of the further prescribed period.

The lateral acceleration evaluation block 230 provides a valuable functionality by limiting the amount by which the value of driver evaluation index 260 can increase in a given lateral acceleration event. Thus it is to be understood that when the driver negotiates a given bend in a road, where the value of lateral acceleration signal 232 is sufficient to trigger the gain activation block 230D to output the value input to it from the increments reference table function block 230C, the lateral acceleration evaluation block 230 limits the amount by which the driver behaviour index 260 can increase.

It is to be understood that a driver may negotiate a relatively tight bend in a relatively non-aggressive manner and still subject the vehicle to relatively high values of lateral acceleration. Thus, since the amount by which the driver behaviour index 260 can increase for a given bend is limited the vehicle is prevented from 'over-reacting' to high values of lateral acceleration, increasing the value of the driver behaviour index 260 by too large an amount.

Figure 6:
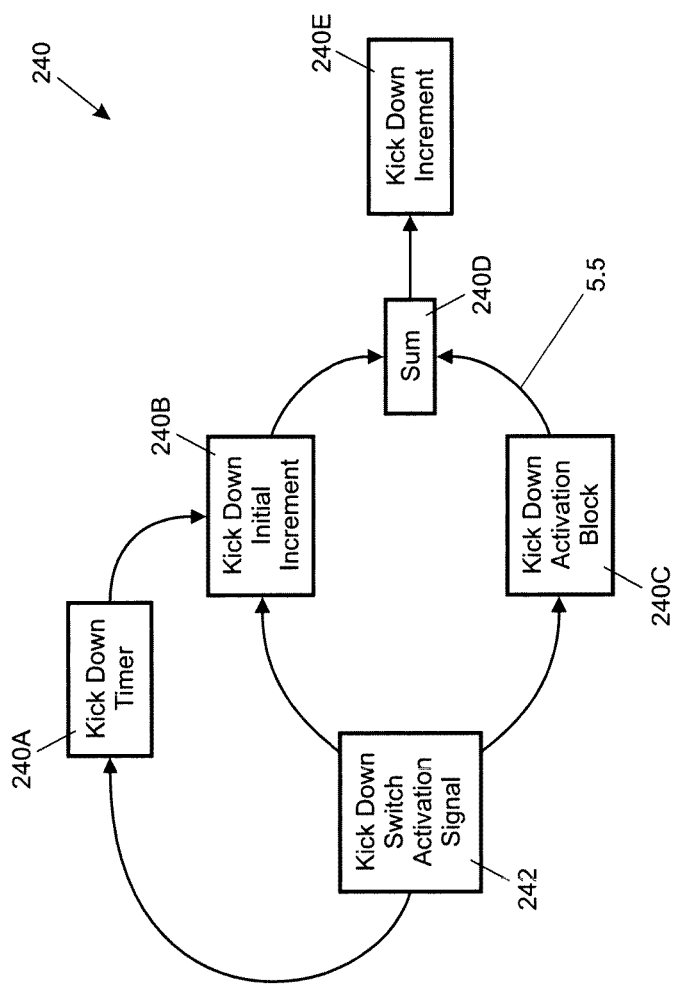
FIG. 6 is a schematic diagram of a kick-down switch evaluation block of the controller of FIG. 2 showing steps in processing a kick-down switch activation signal.

FIG. 6 shows an embodiment of the kick down switch evaluation block 240. The kick down switch activation signal 242 is provided to a kick down timer function block 240A, a kick down initial increment function block 240B and a kick down activation function block 240C.

The evaluation block 240 is configured to output a kick-down increment value 240E being a value by which the driver behaviour index 260 should be increased responsive to activation of the kick-down switch 163S. The block 240 is arranged to limit the amount by which the behaviour index 260 can be increased responsive to the increment value 240E during a given period for which the kick-down switch 163S is activated. Similarly, the block 240 is arranged to limit an amount by which the behaviour index 260 may be incremented responsive to the increment value 240E if the kick-down switch 163S is activated more than once within a prescribed time period.

The timer function block 240A is arranged to commence timing when the switch activation signal 242 indicates the kick-down switch 163S has been activated.

When the timer function block 240A commences timing, the kick-down initial increment function block 240B is configured to output an initial increment value to a sum function block 240D for a prescribed time period determined by reference to the timer function block 240A. That is, when the kick-down switch 163S is activated, the initial increment function block 240B outputs a value (such as integer 10) to the sum function block 240D for a prescribed period of time such as a period of 1 s. Once the period of 1 s has expired the initial increment function block 240B outputs a value of zero.

In some embodiments the initial increment function block 240B outputs a non-zero value for a single time step such that a single step increase in the value of kick-down increment 240E (and therefore of driver evaluation index 260) occurs.

If the switch 163S is released and re-activated within a prescribed period of the initial activation event, the output of the initial increment function block 240B remains set to zero. If the switch is reactivated after expiry of the prescribed period following the initial activation event the output of function block 240B is set to 10 for the prescribed period (1 s in the present example) provided the kick-down switch 163S remains activated throughout this prescribed period. If the switch 163S is released before this period expires, for example after a period of 0.5 s, the output of the function block 240B is set to zero when the switch 163S is released.

Meanwhile, when the kick-down activation signal 242 is received by the kick-down activation block 240C, activation block 240C outputs a fixed value (such as integer 3) to the sum function block 240D during the period for which the kick-down activation signal 242 is received, i.e. the period for which the kick-down switch 163S is depressed.

It is to be understood that the sum function block 240D outputs a value of kick-down increment 240E being the sum of the outputs of the initial increment function block 240B and the kick-down activation block 240C at any given moment in time.

In some arrangements the activation block 240C is arranged to change the value output by it to the sum function block 240D as a function of time during the period for which the kick-down switch 163S is activated. This is in order to limit an amount by which the driver behaviour index 260 may be incremented over a given period for which the kick-down switch 163S is activated.

In one embodiment, when the kick-down switch 163S is initially activated (in an 'initial activation event'), the kick-down activation block 240C outputs a prescribed value (such as increment value 3) for a prescribed period (say 10 s) before outputting a value of zero for the remainder of the period for which the kick-down switch 163S remains depressed.

In some other embodiments the activation block 240C is arranged to provide an output that decreases more gradually as a function of time. In one embodiment the value output by activation block 240C is set to a value of (say) 3 for a period of 10 s, then to a value of 2 for a period of 5 s, then to a value of zero for the remainder of the period for which the switch 163S is activated.

If the switch 163S is released and subsequently re-activated within a prescribed period of the initial activation event (say 20 s), activation block 240C re-commences providing output values as if the activation event was an initial activation event. Thus in the present example the activation function block 240C provides an output value of 3 for a period of 10 s, subsequently a value of 2 for a further period of 5 s and subsequently a value of zero unless the switch 163S is released before expiry of the further 5 s period.

Figure 7:
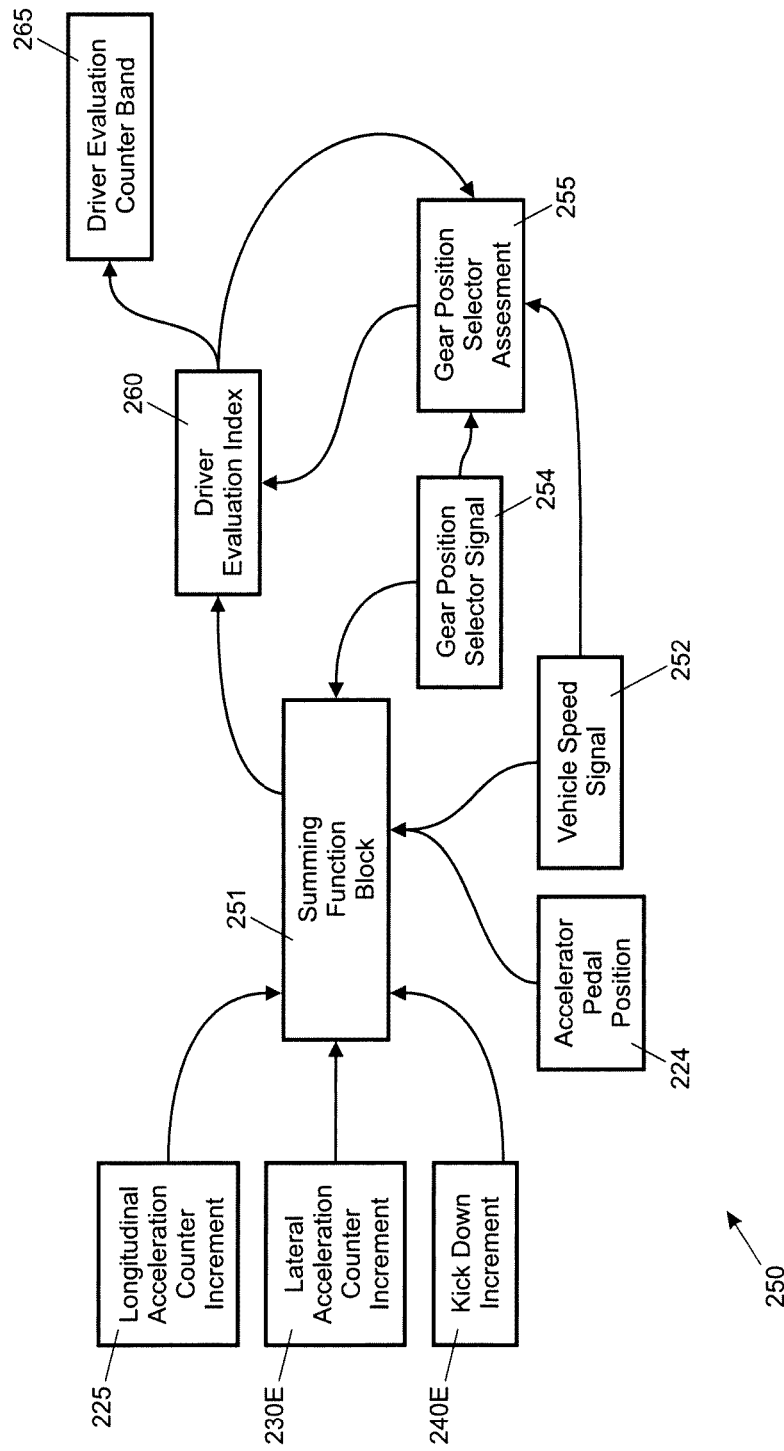
FIG. 7 is a schematic diagram of a counter block of the controller of FIG. 2 showing a process in which output signals from other blocks of the controller are brought together to generate a driver behaviour evaluation index value.

FIG. 7 shows an embodiment of the driver evaluator counter function block 250.

The counter function block 250 has a summing function block 251 that receives increment signals 225, 230E, 240E and sums the signals 225, 230E, 240E to form a single increment value. The signals 225, 230E, 240E are added to form a running total value at prescribed time intervals. The running total is output by the summing function block 251 as the driver behaviour evaluation index 260.

The summing function block 251 also receives the accelerator pedal position signal 224, the vehicle speed signal 252 and gear position selector signal 254 being a signal responsive to a position of the transmission selector control 167 (FIG. 1).

The summing function block 251 is arranged to freeze the value of driver behaviour evaluation index 260 output thereby for a prescribed period of time (i.e. the summing function block 251 does not allow the driver evaluation index 260 to increase or decrease in value) when the vehicle is stationary as determined by reference to the speed signal 252.

Thus for example if the vehicle 100 is stationary at a set of traffic lights or whilst picking up or dropping off a passenger, the driver evaluation index 260 may be frozen for a period of up to 20 s. Other periods of time are also useful.

It is to be understood that if the value of driver evaluation index 260 is not frozen, it is likely to decrease since the driver has less opportunity to demonstrate aggressive behaviour when stationary. However the driver may wish to continue driving aggressively once the traffic lights permit him to continue his journey. By freezing the value of driver evaluation index 260, a risk that the vehicle 100 mistakenly determines that the driver is driving less aggressively is reduced.

If the vehicle 100 has determined that the driver is driving aggressively and the value of driver evaluation index 260 remains frozen whilst the vehicle is stationary, the vehicle may be configured to charge the battery 150 whilst the vehicle is stationary (not turning off the engine) if the driver evaluation index 260 is above a prescribed value, or the counter band value indicates the value of driver evaluation index 260 is above a prescribed value.

The vehicle speed signal 252 and transmission selector control 167 are also used to determine the value that the driver evaluation index 260 is to have following a change to the position of the selector control 167.

If the position of the selector control 167 is changed whilst the vehicle 100 is at rest, the value of driver evaluation index 260 is restored to a default value that is calibrated for each mode, i.e. for each position of the transmission selector control 167.

If whilst the vehicle 100 is moving the driver changes the position of the transmission selector control 167 the default value of the driver evaluation index 260 for the mode corresponding to the newly selected position of the control 167 is compared with the current value of driver evaluation index 260. In some embodiments, if the default value for that mode is less than the current value of driver evaluation index 260 the value of driver evaluation index 260 remains unchanged. In some embodiments, if the default value for that mode is greater than the current value of driver evaluation index 260 the value of driver evaluation index is increased to the default value.

Other arrangements are also useful.

The value of driver evaluation index 260 is fed to a driver evaluation counter band function block 265 that determines within which one of four bands of values of the index 260 the current value of the driver evaluation index 260 falls. As noted above in some embodiments the value of index 260 is divided into a different number of bands of values.

The counter band value 265 is then output to an energy management control portion of the controller 140 of the vehicle 100, as well as to the various function blocks described herein that use the value 265. It is to be understood that the counter band value 265 plays an important role in the calibration of the various maps employed by the controller 140 in order to adjust a sensitivity of the value of driver evaluation index 260 to driver behaviour responsive to the current value of driver evaluation index 260.

The energy management control portion of the controller 140 is arranged to control the vehicle 100 to maintain the battery SoC within a prescribed range of values responsive to the current counter band value 265.

In the present embodiment the controller 140 is arranged to set a target battery SoC value Tsoc that is responsive to the counter band value 265. The higher the counter band value 265 the higher the value of Tsoc. This feature has the advantage that a higher battery SoC is maintained when the driver exhibits more aggressive behaviour. This allows the vehicle 100 to meet more frequent demands for torque boost functionality than would otherwise be possible.

In order to meet the higher battery SoC requirement the vehicle 100 may be controlled to prevent the engine 121 from being switched off automatically when the value of driver behaviour evaluation index 260 (or counter band value 265) exceeds a prescribed value. That is, the engine 121 may be latched into an 'on' condition such that it is not turned off automatically by the vehicle 100. This feature has the advantage of reducing a risk that the driver experiences a delay in response of the vehicle 100 to a sudden increase in driver demanded torque.

Furthermore, when the value of driver evaluation index 260 (or counter band value 265) exceeds a prescribed value the vehicle 100 may be arranged to assume a parallel recharge mode of operation when conditions permit in order to ensure that the battery 150 has a sufficiently high SoC to permit torque boost operation when required. Thus if the vehicle 100 is stationary (for example when waiting at traffic lights) the vehicle 100 may be configured to assume the parallel recharge mode of operation until the driver demands an amount of torque exceeding a prescribed value at which time the vehicle 100 may assume the parallel boost mode of operation as required. Similarly, when the vehicle 100 is cruising or coasting the vehicle 100 may be arranged to assume the parallel recharge mode in order to further increase the battery SoC.

Embodiments of the present invention provide a hybrid electric vehicle (HEV) 100 having driver behaviour evaluation functionality. The vehicle 100 is arranged to evaluate the driving behaviour of a driver and to adapt a control strategy implemented by the HEV 100 to the behaviour. Embodiments of the invention have the advantage that a performance of the vehicle 100 may be optimised for a particular style of driving adopted by a driver on a given journey, providing enhanced performance and reduced risk of a reduction in performance due for example to low battery SoC when operating in a hybrid mode.

Furthermore embodiments of the invention have the advantage that a driver is not required manually to select a 'hybrid inhibit' mode of operation in which EV mode and stop/start functionality is suspended. Rather, the vehicle responds automatically to driver behaviour by means of the driver behaviour evaluation functionality of the vehicle 100 and in some arrangements suspends automatically EV mode and/or stop/start functionality.

Other arrangements are also useful.

Some embodiments of the invention are arranged to change a target battery SoC of the vehicle 100 responsive to a driving style/behaviour of a driver.

Some embodiments of the invention are arranged to change a minimum allowable battery SoC of the vehicle 100 responsive to a driving style/behaviour of a driver.

Some embodiments of the invention are arranged to override (prevent) shut-down of the engine 121 of the vehicle 100 responsive to a driving style/behaviour of a driver.

Some embodiments of the invention are arranged to determine driving style/behaviour of a driver responsive to a relative amount of total brake torque demanded by a driver that is provided by regenerative braking. The higher the relative proportion provided by friction braking, the more the driver's behaviour is determined to be aggressive.

Some embodiments of the invention are arranged to determine driving style/behaviour of a driver responsive to a relative amount of total brake torque demanded by a driver that is provided by friction braking versus regenerative braking. The higher the relative proportion provided by friction braking, the more the driver's behaviour is determined to be aggressive.

Some embodiments of the invention are arranged to determine driving style/behaviour of a driver responsive to a relative amount of total brake torque demanded by a driver that is provided by friction braking versus regenerative braking over a plurality of braking events, for example a prescribed number or braking events. The higher the relative proportion provided by friction braking, the more the driver's behaviour is determined to be aggressive.

Embodiments of the present invention may be understood by reference to the following numbered paragraphs:

1. A controller for a hybrid electric vehicle having a powertrain comprising an engine and at least one electric machine, at least one said at least one electric machine being operable as a propulsion motor to provide drive torque to drive the vehicle, and an energy storage device for storing electrical energy for powering the at least one electric machine as a propulsion motor, the controller being arranged to control the engine and at least one electric machine to provide torque to drive the vehicle in a hybrid vehicle (HV) mode in which the engine is switched on or an electric vehicle (EV) mode in which the engine is switched off, the controller being further arranged to:

monitor a value of one or more parameters associated with the vehicle;

identify a current driving style of a driver in dependence on the value of the one or more parameters; and control the powertrain to operate in the HV or EV modes in dependence on the driving style of the user.

2. A controller as described in paragraph 1 operable to control at least one said at least one electric machine to operate as a generator to generate electrical energy for storage in the energy storage device.

3. A controller as described in paragraph 1 wherein the driving style ranges from an economy-oriented driving style to a performance-oriented driving style 4. A controller as described in paragraph 3 operable to control the powertrain to operate in a torque boost mode of operation in which at least one said at least one electric machine operates as a propulsion motor to provide drive torque to drive the vehicle in parallel with the engine, the controller being operable to control the engine and at least one electric machine in dependence on the driving style of the user thereby to prevent the amount of energy stored in the energy storage device from falling to a value preventing assumption of the torque boost mode.

5. A controller as described in paragraph 1 wherein the one or more parameters monitored by the controller comprise at least one selected from amongst:
   (a) a speed of rotation of the engine;
   (b) a speed of rotation of the electric machine;
   (c) a speed of the vehicle;
   (d) a longitudinal acceleration of the vehicle;
   (e) a lateral acceleration of the vehicle;
   (f) an accelerator pedal position;
   (g) a state of an accelerator pedal kick-down detector;
   (h) a brake pedal position;
   (i) a gear ratio between the engine or the at least one electric machine operable as a
   propulsion motor and one or more wheels of the vehicle;
   (j) a proportion of an amount of a brake torque requested by the driver that is provided
   by regenerative braking;
   (k) an amount of energy stored in the energy storage device;
   (l) a speed of at least one portion of a driveline of the vehicle; and
   (m) an amount of positive drive torque.

6. A controller as described in paragraph 2 wherein the at least one electric machine operable as a propulsion motor is also operable as a generator.

7. A controller as described in paragraph 1 operable to calculate a value of a driver behaviour index in dependence on the driving style of a driver.

8. A controller as described in paragraph 7 configured to change the value of the driver behaviour index towards a first value when the driver displays an economy-oriented driving style and to change the value of the driver behaviour index towards a second value when the driver displays a performance-oriented driving style.

9. A controller as described in paragraph 8 arranged to increase a target state of charge of the energy storage device as the value of the driver behaviour index tends towards the second value and to reduce the target state of charge of the energy storage device as the value of the driver behaviour index tends towards the first value.

10. A controller as described in paragraph 8 configured to change the value of the driver behaviour index towards the second value in dependence on a value of longitudinal acceleration of the vehicle.

11. A controller as described in paragraph 10 configured to change the value of driver behaviour index towards the second value when the value of longitudinal acceleration is more positive than an index increase positive threshold value being a positive acceleration value or is more negative than an index increase negative threshold value being a negative acceleration value.

12. A controller as described in paragraph 10 configured to change the value of driver behaviour index towards the first value when the value of longitudinal acceleration is between an index decrease positive threshold value being a positive value and an index decrease negative threshold value being a negative value.

13. A controller as described in paragraph 11 configured to prevent the value of driver behaviour index changing in response to the value of longitudinal acceleration, in dependence on a value of lateral acceleration.

14. A controller as described in paragraph 13 configured to prevent the value of driver behaviour index changing in dependence on the value of longitudinal acceleration when the value of lateral acceleration exceeds a prescribed value.

15. A controller as described in paragraph 8 configured to change the value of the driver behaviour index in dependence on a relative amount of a demanded braking torque that is provided by regenerative braking.

16. A controller as described in paragraph 15 configured to change the value of the driver behaviour index towards the second value when the relative amount of a demanded braking torque that is provided by regenerative braking is below a prescribed amount.

17. A controller as described in paragraph 8 configured to change the value of driver behaviour index responsive to at least one selected from amongst brake pedal pressure, brake pedal position, rate of change of brake pedal pressure and rate of change of brake pedal position.

18. A controller as described in paragraph 8 configured to change the value of the driver behaviour index in dependence on at least one selected from amongst accelerator pedal position and a rate of change of accelerator pedal position.

19. A controller as described in paragraph 8 configured to change the value of the driver behaviour index in dependence on activation of an accelerator pedal kick-down switch.

20. A controller as described in paragraph 8 configured to change the value of the driver behaviour index in dependence on a speed of the vehicle.

21. A controller as described in paragraph 8 configured to change the value of driver behaviour index in dependence on one selected from amongst a selected gear of a transmission of the vehicle and a state of a performance mode selector.

22. A controller as described in paragraph 1 operable to latch the engine in an on condition in dependence on the driving style of the driver.

23. A controller as described in paragraph 22 operable to provide feedback to the driver as to whether the engine has been latched on because of the driving style of the driver.

24. A controller as described in paragraph 3 operable to provide feedback to the driver in dependence on a result of the determination whether the driving style corresponds to a performance oriented driving style or an economy oriented driving style.

25. A controller as described in paragraph 23 operable to provide feedback by one selected from amongst a visual indicator device and an audible indicator device.

26. A controller as described in paragraph 24 operable to provide feedback by one selected from amongst a visual indicator device and an audible indicator device.

27. A method of controlling a hybrid electric vehicle having a powertrain comprising an engine and at least one electric machine, at least one said at least one electric machine being operable as a propulsion motor to provide drive torque to drive the vehicle, and an energy storage device for storing electrical energy for powering the at least one electric machine as a propulsion motor,
the method comprising controlling the engine and at least one electric machine to provide torque to drive the vehicle in a hybrid vehicle (HV) mode in which the engine is switched on or an electric vehicle (EV) mode in which the engine is switched off,
the method further comprising:
monitoring a value of one or more parameters associated with the vehicle;
identifying a current driving style of a driver in dependence on the value of the one or more parameters; and
controlling the powertrain to operate in the HV or EV modes in dependence on the driving style of the user.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller for a hybrid electric vehicle having a powertrain comprising an engine and at least one electric machine, at least one of said at least one electric machine being operable as a propulsion motor to provide drive torque to drive the vehicle, and an energy storage device that powers the at least one electric machine as a propulsion motor,
the controller being configured to control the engine and the at least one electric machine to provide torque to drive the vehicle in a hybrid vehicle (HV) mode in which the engine is switched on or an electric vehicle (EV) mode in which the engine is switched off, the controller being further configured to:
monitor a value of one or more parameters associated with the vehicle;
identify a current driving style of a driver in dependence on the value of the one or more parameters;
calculate a value of a driver behaviour index in dependence on the driving style of the driver;
control the powertrain to operate in the HV or EV modes in dependence on the driving style of the driver;
control at least one of said at least one electric machines to operate as a generator to generate electrical energy for storage in the energy storage device;
control the powertrain to operate in a torque boost mode of operation in which at least one of said at least one electric machine operates as a propulsion motor to provide drive torque to drive the vehicle in parallel with the engine;
control the engine and the at least one electric machine in dependence on the value of the driver behaviour index thereby to prevent the amount of energy stored in the energy storage device from falling to a value preventing assumption of the torque boost mode; and
prevent the value of the driver behaviour index changing in response to a value of longitudinal acceleration, when a value of lateral acceleration exceeds a prescribed value.

2. The controller of claim 1, wherein the driving style ranges from an economy-oriented driving style to a performance-oriented driving style.

3. The controller of claim 1, wherein the one or more parameters monitored by the controller comprise at least one selected from amongst:
(a) a speed of rotation of the engine;
(b) a speed of rotation of the electric motor machine;
(c) a speed of the vehicle;
(d) a longitudinal acceleration of the vehicle;
(e) a lateral acceleration of the vehicle;
(f) an accelerator pedal position;
(g) a state of an accelerator pedal kick-down detector;
(h) a brake pedal position;
(i) a gear ratio between the engine or the at least one electric machine operable as the propulsion motor and one or more wheels of the vehicle;
(j) a proportion of an amount of a brake torque requested by the driver that is provided by regenerative braking;

(k) an amount of energy stored in the energy storage device;
(l) a speed of at least one portion of a driveline of the vehicle; and
(m) an amount of positive drive torque.

4. The controller of claim 1, configured to change the value of the driver behaviour index towards a first value when the driver displays an economy-oriented driving style and to change the value of the driver behaviour index towards a second value when the driver displays a performance-oriented driving style.

5. The controller of claim 4, arranged to increase a target state of charge of the energy storage device as the value of the driver behaviour index tends towards the second value and to reduce the target state of charge of the energy storage device as the value of the driver behaviour index tends towards the first value.

6. The controller of claim 4, configured to change the value of the driver behaviour index towards the second value in dependence on a value of longitudinal acceleration of the vehicle.

7. The controller of claim 6, configured to change the value of the driver behaviour index towards the second value when the value of longitudinal acceleration is more positive than an index increase positive threshold value being a positive acceleration value or is more negative than an index increase negative threshold value being a negative acceleration value.

8. The controller of claim 6, configured to change the value of driver behaviour index towards the first value when the value of longitudinal acceleration is between an index decrease positive threshold value being a positive value and an index decrease negative threshold value being a negative value.

9. The controller of claim 4, configured to change the value of the driver behaviour index in dependence on a relative amount of a demanded braking torque that is provided by regenerative braking.

10. The controller of claim 9, configured to change the value of the driver behaviour index towards the second value when the relative amount of a demanded braking torque that is provided by regenerative braking is below a prescribed amount.

11. The controller of claim 4, configured to change the value of driver behaviour index responsive to at least one selected from amongst brake pedal pressure, brake pedal position, rate of change of brake pedal pressure and rate of change of brake pedal position.

12. The controller of claim 1, operable to latch the engine in an on condition in dependence on the driving style of the driver.

13. The controller of claim 12, operable to provide feedback to the driver as to whether the engine has been latched on because of the driving style of the driver.

14. The controller of claim 2, operable to provide feedback to the driver in dependence on a result of the determination whether the driving style corresponds to a performance oriented driving style or an economy oriented driving style.

15. The controller of claim 13, operable to provide feedback via a visual indicator or an audible indicator.

16. A method of controlling a hybrid electric vehicle having a powertrain comprising an engine and at least one electric machine, at least one of said at least one electric machine being operable as a propulsion motor to provide drive torque to drive the vehicle, and an energy storage device that powers the at least one electric machine as a propulsion motor,
the method comprising controlling the engine and at least one electric machine to provide torque to drive the vehicle in a hybrid vehicle (HV) mode in which the engine is switched on or an electric vehicle (EV) mode in which the engine is switched off, the method further comprising:
monitoring a value of one or more parameters associated with the vehicle;
identifying a current driving style of a driver in dependence on the value of the one or more parameters;
calculating a value of a driver behaviour index in dependence on the driving style of the driver;
controlling the powertrain to operate in the HV or EV modes in dependence on the driving style of the driver;
controlling at least one said at least one electric machine to operate as a generator to generate electrical energy for storage in the energy storage device;
controlling the powertrain to operate in a torque boost mode of operation in which at least one said at least one electric machine operates as a propulsion motor to provide drive torque to drive the vehicle in parallel with the engine;
controlling the engine and at least one electric machine in dependence on the value of the driver behaviour index thereby to prevent the amount of energy stored in the energy storage device from falling to a value preventing assumption of the torque boost mode; and
preventing the value of the driver behaviour index changing in response to a value of longitudinal acceleration, when a value of lateral acceleration exceeds a prescribed value.

17. A vehicle comprising the controller of claim 1.

* * * * *